(12) United States Patent
Stuetz et al.

(10) Patent No.: US 9,484,564 B2
(45) Date of Patent: Nov. 1, 2016

(54) ELECTRICAL ENERGY STORAGE

(71) Applicant: AVL LIST GMBH, Graz (AT)

(72) Inventors: Harald Stuetz, Semriach (AT); Martin Michelitsch, Kumberg (AT); Michael Körösi, St. Ruprecht (AT)

(73) Assignee: AVL LIST GMBH, Graz (AT)

( * ) Notice: Subject to any disclaimer, the term of this patent is extended or adjusted under 35 U.S.C. 154(b) by 26 days.

(21) Appl. No.: 14/422,550

(22) PCT Filed: Aug. 21, 2013

(86) PCT No.: PCT/EP2013/067356
§ 371 (c)(1),
(2) Date: Feb. 19, 2015

(87) PCT Pub. No.: WO2014/029794
PCT Pub. Date: Feb. 27, 2014

(65) Prior Publication Data
US 2015/0236313 A1    Aug. 20, 2015

(30) Foreign Application Priority Data

Aug. 21, 2012 (AT) .............................. A 50332/2012

(51) Int. Cl.
| | |
|---|---|
| *H01M 10/48* | (2006.01) |
| *H01M 2/10* | (2006.01) |
| *H01M 10/42* | (2006.01) |
| *H01M 10/625* | (2014.01) |
| *H01M 10/6554* | (2014.01) |
| *H01M 2/12* | (2006.01) |

(52) U.S. Cl.
CPC ......... *H01M 2/1077* (2013.01); *H01M 2/1083* (2013.01); *H01M 2/12* (2013.01); *H01M 10/4207* (2013.01); *H01M 10/486* (2013.01); *H01M 10/625* (2015.04); *H01M 10/6554* (2015.04); *H01M 2220/20* (2013.01)

(58) Field of Classification Search
CPC .. H01M 2/12; H01M 2/1083; H01M 2/1077; H01M 10/4207; H01M 10/486; H01M 2220/20
See application file for complete search history.

(56) References Cited

U.S. PATENT DOCUMENTS

| | | |
|---|---|---|
| 2007/0259258 A1 | 11/2007 | Buck |
| 2011/0104532 A1* | 5/2011 | Buck ...................... F16K 17/16 429/82 |

FOREIGN PATENT DOCUMENTS

| | | |
|---|---|---|
| DE | 8620714 U1 | 11/1986 |
| DE | 102008059972 A1 | 6/2010 |
| DE | 10 2010 020 065 A1 | 11/2011 |
| EP | 0 631 338 A1 | 12/1994 |
| JP | H01 195673 A | 8/1989 |
| JP | 2002 231297 A | 8/2002 |
| WO | 99/05746 A1 | 2/1999 |
| WO | 2008/048751 A | 4/2008 |
| WO | 2009/140199 A2 | 11/2009 |
| WO | 2011/141127 A1 | 11/2011 |

* cited by examiner

*Primary Examiner* — Jane Rhee
(74) *Attorney, Agent, or Firm* — Jordan IP Law, LLC; Todd A. Vaughn

(57) ABSTRACT

An electric energy storage device for an electric vehicle, which storage device including at least one battery module having a plurality of especially flat and substantially plate-shaped battery cells which are electrically connected to one another and which are arranged next to one another or one above the other between at least two pressure plates in at least one stack. At least one battery cell and/or the battery module is surrounded by a plastic structure.

18 Claims, 2 Drawing Sheets

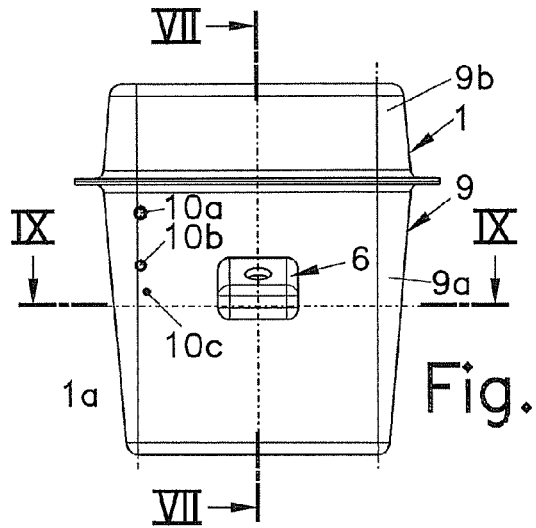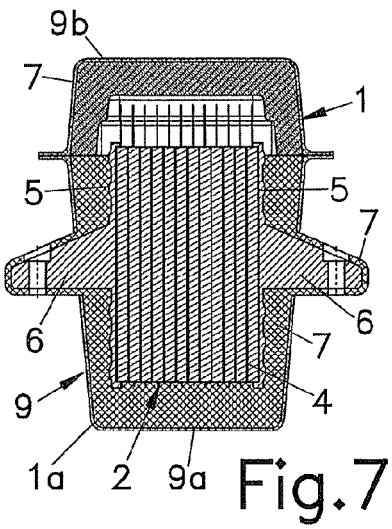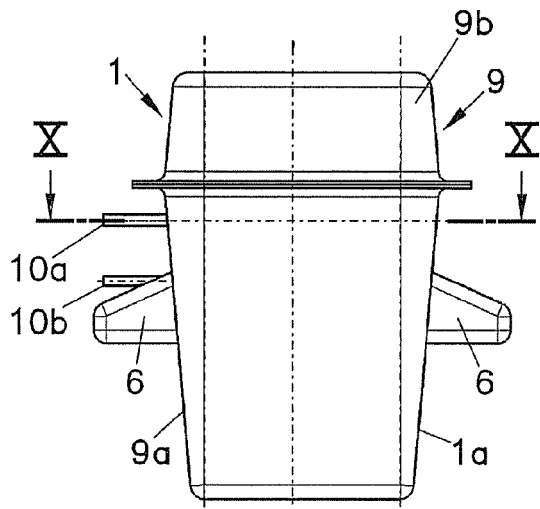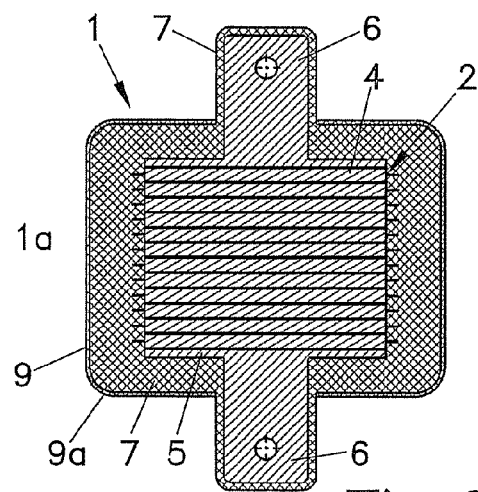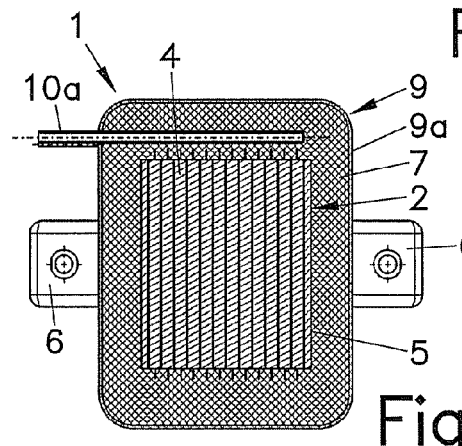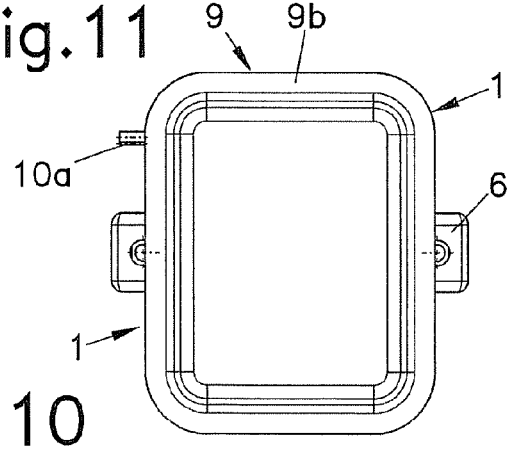

ELECTRICAL ENERGY STORAGE

CROSS-REFERENCE TO RELATED APPLICATIONS

The present application is a National Stage Application of PCT International Application No. PCT/EP2013/067356 (filed on Aug. 21, 2013), under 35 U.S.C. §371, which claims priority to Austrian Patent Application No. A 50332/2012 (filed on Aug. 21, 2012), which are each hereby incorporated by reference in their respective entireties.

TECHNICAL FIELD

The invention relates to an electric energy storage device, especially for an electric vehicle, which storage device comprises at least one battery module having a plurality of especially flat and substantially plate-shaped battery cells which are electrically connected to one another and which are arranged next to one another or one above the other between at least two pressure plates in at least one stack, and wherein at least one battery cell and/or the battery module is surrounded by a plastic structure, in particular encapsulated by foam.

BACKGROUND

A battery with battery modules having a plurality of flat and substantially plate-shaped individual battery cells is known from WO 2008/048751 A1. The individual battery cells are stacked into a cell stack and surrounded by a battery housing. A foamed material structure is provided between the battery modules and the housing.

DE 86 20 714 U1 discloses a battery with cylindrical battery cells which are arranged in a common housing. An insulating layer is arranged between the battery cells and the housing.

DE 10 2008 059 972 A1 describes a lithium-ion battery having a plurality of individual cells switched in series and/or in parallel, and a cooling plate arranged on the pole side on the individual cells, wherein the individual cells are arranged in a battery housing with a lid. Support elements made of a foamed material are arranged between the cylindrical battery cells.

US 2007/259258 A1 describes an energy storage arrangement of the kind mentioned above, comprising a plurality of battery cells which are housed in a housing, wherein the intermediate spaces between the individual cells and the housing are encapsulated by foaming.

Known batteries require separate retaining apparatuses in order to mount the energy storage device in a vehicle for example. The battery cells are usually rigidly connected to the housing, wherein the housing is fixed to the vehicle via retaining apparatuses fixed to the housing. It is disadvantageous that the mounting and dismounting of the battery modules is relatively time-consuming, and that many parts are required for fixing, thus increasing the costs and the weight of the energy storage device.

SUMMARY

It is the object of the invention to enable secure fastening of the energy storage device with as little effort as possible and with a low number of parts.

This is achieved in accordance with the invention in such a way that the battery cells are encapsulated by foam in the clamped state between the pressure plates. This ensures secure fastening of the battery cells with a low number of parts. By using pressure plates during the foaming, which are also not removed after curing of the plastic structure, the individual battery cells are securely fixed in their position. In the case of the known energy storage devices, foaming mainly occurs in foam moulds, which rest at least partly on one or several battery cells, so that regions of the battery cells are exposed after the removal of the foam moulds. In contrast thereto, in the present invention every single battery cell is either surrounded entirely by the plastic structure or is in direct contact with at least one pressure plate, which further improves the stiffness and mechanical stability of the stack or battery module formed by the battery cells.

It is preferably provided that at least one pressure plate, and preferably all pressure plates, respectively comprises at least one support bracket, which is especially preferably guided through an exterior wall of the energy storage device. The support bracket allows secure fastening of the energy storage device to supporting parts of the vehicle.

It is provided in an embodiment of the invention which saves parts that the support bracket is integrally arranged with the pressure plate, wherein preferably the support bracket is surrounded at least partly by the plastic structure. The support bracket is screwed together with the vehicle for fastening the energy storage device. The thermally insulating encapsulation by foam of the support bracket prevents thermal bridges to the exterior.

In a preferred embodiment of the invention, the exterior wall of the energy storage device is formed by a housing surrounding the battery module, wherein a space which is filled by the plastic structure is formed between the battery module on the housing. The battery module can be spaced on all sides from the housing. This ensures good thermal insulation. The housing may form a protective hard exterior shell for the battery modules.

The electric cell poles of the battery cells can protrude out of the plastic structure.

The housing can advantageously be arranged in several parts and consist at least of one bottom part and a lid part that can be placed thereon, wherein preferably both the bottom part and also the lid part can be filled with the plastic structure.

A separate housing can be omitted however when the exterior wall of the energy storage device is formed by the plastic structure (e.g. by integral foam). A liquid-tight sheathing of the battery modules is ensured by a closed pore structure of the plastic structure which is preferably formed by a foamed material structure.

It can further be provided within the scope of the invention that each battery cell per se, and in addition each battery module, is respectively surrounded by a plastic structure, wherein preferably the plastic structure surrounds the welding seam of the battery cells which are formed as pouch cells. The battery cells can also be arranged as metal-can cells as an alternative to the pouch cells. In the case of metal-can cells, each battery cell is surrounded by a metal housing.

It can further be provided in a further development of the invention that electric cables, busbars, at least one cooling line, at least one degassing line, at least one thermally conductive plate and/or at least one thermal sensor are also encapsulated by foam. As a result, high-voltage cables, low-voltage cable harnesses, busbars, cooling lines, air guides, degassing lines, thermally conductive plates, control devices and/or thermal sensors can be fixed by the plastic structure.

DRAWINGS

The invention will be explained below in closer detail by reference to the drawings, wherein:

FIG. 6 shows the energy storage device in a side view;

FIG. 7 shows the energy storage device in a sectional view along the line VII-VII in FIG. 6;

FIG. 8 shows the energy storage device in a front view;

FIG. 9 shows the energy storage device in a sectional view along the line IX-IX in FIG. 6;

FIG. 10 shows the energy storage device in a sectional view along the line X-X in FIG. 8, and FIG. 11 shows the energy storage device in a top view.

DESCRIPTION

Figure 1:
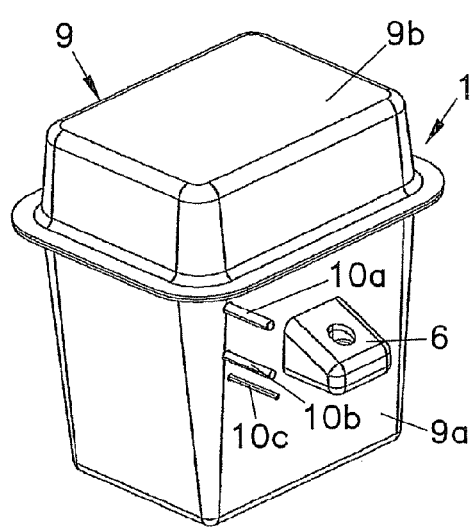
FIG. 1 shows an oblique view of an energy storage device in accordance with the invention.
Figure 2:
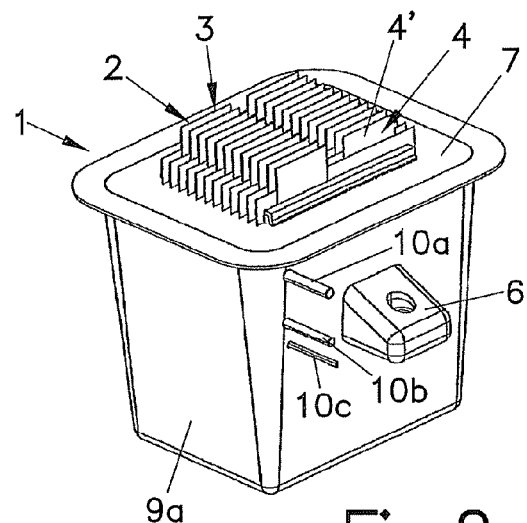
FIG. 2 shows an oblique view of the energy storage device with removed lid part.
Figure 3:
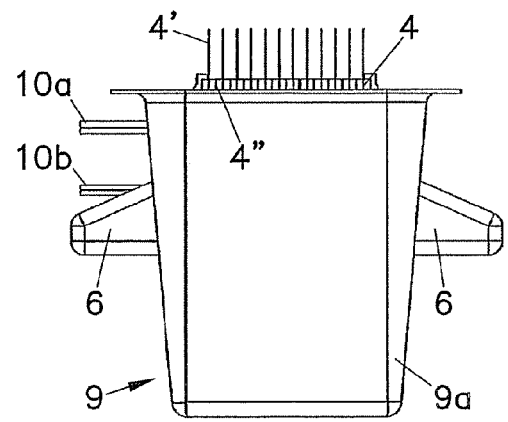
FIG. 3 shows this energy storage device in a side view.

The energy storage 1, which is shown in the drawings and is formed by a rechargeable battery, comprises a battery module 2 with at least one stack 3 of plate-shaped battery cells 4 (pouch cells) which are situated next to one another and which are pressed against each other by pressure plates 5. The pressure plates 5 respectively comprise a support bracket 6, with which the energy storage device 1 can be fastened to a vehicle. The energy storage device 1 can also comprise several battery modules 2, wherein adjacent battery modules 2 can be electrically switched together in series or in parallel.

Figure 4:
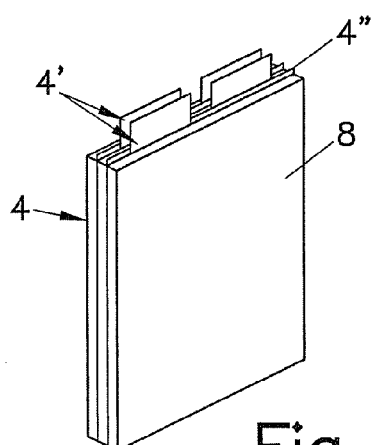
FIG. 4 shows the battery cells of the energy storage device in an oblique view.
Figure 5:
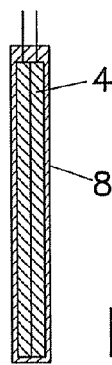
FIG. 5 shows the battery cells of FIG. 4 in a longitudinal sectional view.

Both the battery module 2 and also the support brackets 6 are surrounded by a plastic structure 7. Furthermore, the battery cells 4 per se can also separately be encapsulated by foam by means of a plastic structure 8, as shown in FIG. 4 and FIG. 5.

The weld edge 4" of the battery cells 4 arranged as pouch cells is surrounded by the plastic structure 7, 8, as a result of which the battery cells 4 are mechanically fixed and thermally and/or electrically insulated.

The battery cells 4 are clamped between the pressure plates 5 prior to the encapsulation by foam. Cooling lines can be fixed to the cell poles 4' prior to the encapsulation by foam, and subsequently the entire battery module 2 is encapsulated by foam. The plastic structure 7, 8 should be more elastically than plastically deformable after the encapsulation by foam.

The outer wall 1a of the energy storage device 1 is formed in the embodiment shown in the drawings by a multi-part housing 9, which consists of a bottom part 9a and a lid part 9b which is inserted thereon. The space between the battery module 2 and the bottom housing part 9a is filled with foam and filled with of the plastic structure 7. The lid part 9a is also substantially filled with the plastic structure 7.

As is shown in FIG. 7, FIG. 8 and FIG. 9, there are no direct fastening points on the housing 9. The fastening points are formed by support brackets 6 which are rigidly connected to the pressure plates 5 and which penetrate the outer walls 1a of the energy storage device 1, namely the bottom part 9a of the housing 9. The housing 9 and the battery module 2 are only connected to each other by the plastic structure 7. As a result, a common support structure is produced for all components arranged in the housing 9. The plastic structure 7, 8 protects the battery cells 4 on the one hand and provides the possibility on the other hand to mount the energy storage device 1 by means of the pressure plates 5 to longitudinal beams, cross-beams or other parts in the motor vehicle. The fastening of the support brackets 6 to the vehicle occurs in a rigid fashion or optionally in a decoupled fashion.

As is shown in FIG. 4 and FIG. 5, the battery cells 4 can be encapsulated individually—in addition to the entire battery modules 2—with a plastic structure 8 (e.g. foam) in order to counteract the cycle-induced swelling of the battery cells 4.

The lid part 9b of the housing 9 is also packed by foamed material for the protection of the cell poles 4' of the battery cells 4 and for thermal insulation, as is shown in FIG. 7. The thickness of the plastic structure 7 in the lid part 9b can vary, wherein the plastic structure 7 should reach as close as possible up to the installed components in order to reduce the air volume and to thus minimise the likelihood of condensate formation. The space beneath the lid part 9b can be used for cooling the battery cells 4. Cell pole and busbar cooling can occur with air for example, which is blown through the space. Cooling of the cell poles 4' and the busbars can also occur by liquid cooling devices.

Various cooling agent feed and discharge lines 10a, 10b, electric power cables 10c (low-voltage and/or high-voltage cables), busbars, degassing lines, thermally conductive plates (for better distribution of the heat between the battery cells), air guides, control devices, thermal sensors or the like can also be encapsulated by foam at least in part. A line system for cell degassing (not shown in closer detail) can be encapsulated by foam in the plastic structure 7 around the battery cells 4 or in the lid part 9b. Loose cables or lines can thus be avoided. The cooling agent feed and discharge lines 10a, 10b can be guided for example through the outer wall 1a and protrude from the housing 9.

Depending on the field of application, the housing 9 can be made of plastic, aluminium or sheet steel.

A special form of the energy storage device 1 is achieved in that the plastic structure 7 simultaneously forms the outer wall 1', wherein a separate housing 9 can thus be omitted. The plastic structure 7 can subsequently be applied with a predefined layer thickness (e.g. 2 mm to 5 mm) to the plastic structure 8 of the battery cell 4 for the protection against exterior influences (spray water, ageing or the like), or it is pressed or shaped in advance as a separate component and can subsequently be connected thereafter in a non-detachable manner by gluing for example to the already existing compound between the cells and the foamed material. The lid part 9b covering the cell poles 4' can also be arranged in a shell-free manner and be formed by the plastic structure 7. The foam structure 7 should cure with a dense surface. The advantage of this embodiment is that costs and weight can be saved since separate housing shells are avoided.

The plastic structure 7 can be arranged in a self-supporting manner, so that only a low amount of retaining material is necessary for integration in the vehicle.

The form and the position of the retaining points can thus vary and is independent of the existing vehicle chassis and less dependent on the precise position and arrangement of longitudinal beams or cross-beams of the vehicle.

As a result of the distinct lightweight construction of the energy storage device 1, the energy density can be increased substantially and the production costs can be reduced considerably by simplifying the production process and by reducing complex components. Furthermore, the reliability of the battery and the mechanical and chemical protection for the battery cells 4 is improved substantially by the plastic structure. The plastic structure 7 ensures optimal thermal insulation of the battery cells. The plastic structure 7 displaces the air volume within the energy storage device 1 to a minimum, thus considerably reducing the likelihood of condensation.

What is claimed is:

1. An electric energy storage device for an electric vehicle, the storage device comprising:
   at least one battery module having a plurality of flat and substantially plate-shaped battery cells which are electrically connected to one another, and which are arranged next to one another between at least two pressure plates in at least one stack, wherein at least one of the battery cells is encapsulated by a plastic structure in a clamped state of the battery cells between the pressure plates, wherein the at least two pressure plates respectively comprises at least one support bracket; and
   a housing which surrounds the at least one battery module, and which has an outer wall through which the at least one support bracket is guided, wherein a space which is filled by the plastic structure is formed between the at least one battery module and the housing.

2. The energy storage device of claim 1, further comprising an outer wall through which the support bracket is guided.

3. The energy storage device of claim 1, wherein the support bracket is integrally arranged with the pressure plate.

4. The energy storage device of claim 1, wherein the support bracket is surrounded at least partially by the plastic structure.

5. The energy storage device of claim 1, wherein the housing comprises one out of aluminium, sheet steel, and plastic.

6. The energy storage device of claim 5, wherein the battery module is spaced on all sides from the housing.

7. The energy storage device of claim 1, wherein:
   the housing is arranged in several parts and includes at least a bottom part and a lid part that is insertable thereon; and
   both the bottom part and the lid part are filled with the plastic structure.

8. The energy storage device of claim 1, wherein the outer wall is formed by the plastic structure.

9. The energy storage device of claim 1, further comprising at least a space to guide air is formed between the lid part and the bottom part.

10. The energy storage device of claim 1, wherein the plastic structure comprises a foamed material.

11. The energy storage device of claim 1, wherein the plastic structure is arranged in a thermally insulating manner and has a closed pore structure.

12. The energy storage device of claim 1, wherein the battery cells comprise pouch cells.

13. The energy storage device of claim 11, wherein the pouch cells each have a weld seam surrounded by the plastic structure.

14. The energy storage device of claim 1, wherein the battery cells comprise metal-can cells.

15. The energy storage device of claim 1, further comprising:
   electric cables;
   busbars;
   at least one cooling line;
   at least one air guide;
   at least one degassing line;
   at least one thermally conductive plate;
   at least one control device; and
   at least one thermal sensor.

16. The energy storage device of claim 15, wherein the electric cables, the busbars, the at least one cooling line, the at least one air guide, the at least one degassing line, the at least one thermally conductive plate, the at least one control device, and the at least one thermal sensor are surrounded by the plastic structure.

17. An electric energy storage device for an electric vehicle, the storage device comprising:
   at least one battery module having a plurality of flat and substantially plate-shaped battery cells which are electrically connected to one another, and which are arranged next to one another between at least two pressure plates in at least one stack, wherein each one of the battery cells and each one of the at least one battery module is encapsulated by a plastic structure in a clamped state of the battery cells between the pressure plates, wherein the at least two pressure plates respectively comprises at least one support bracket; and
   a housing which surrounds the at least one battery module, and which has an outer wall through which the at least one support bracket is guided, wherein a space which is filled by the plastic structure is formed between the at least one battery module and the housing.

18. The energy storage device of claim 17, wherein the battery cells have electric cell poles which protrude from the plastic structure.

* * * * *